(12) United States Patent
Harter, Jr. et al.

(10) Patent No.: US 12,505,295 B2
(45) Date of Patent: Dec. 23, 2025

(54) SYSTEM AND METHOD FOR DETERMINING BIAS CONCEPT/DOCUMENT IN A SET OF DOCUMENTS

(71) Applicant: Luminoso Technologies, Inc., Boston, MA (US)

(72) Inventors: William Wood Harter, Jr., Aliso Viejo, CA (US); Kim Larson, Portland, OR (US)

(*) Notice: Subject to any disclaimer, the term of this patent is extended or adjusted under 35 U.S.C. 154(b) by 265 days.

(21) Appl. No.: 18/081,848

(22) Filed: Dec. 15, 2022

(65) Prior Publication Data

US 2024/0202450 A1 Jun. 20, 2024

(51) Int. Cl.
*G06F 40/30* (2020.01)
*G06F 40/123* (2020.01)
*G06F 40/279* (2020.01)
*G06N 20/00* (2019.01)

(52) U.S. Cl.
CPC .......... *G06F 40/30* (2020.01); *G06F 40/123* (2020.01); *G06F 40/279* (2020.01); *G06N 20/00* (2019.01)

(58) Field of Classification Search
CPC ...... G06F 40/30; G06F 40/123; G06F 40/279; G06N 20/00
See application file for complete search history.

(56) References Cited

U.S. PATENT DOCUMENTS

| | | | |
|---|---|---|---|
| 9,436,742 B1* | 9/2016 | Hammad | G06F 16/9535 |
| 2009/0319342 A1* | 12/2009 | Shilman | G06Q 30/02 705/7.41 |
| 2015/0052120 A1* | 2/2015 | Bhatia | G06F 16/24578 707/723 |
| 2018/0018316 A1* | 1/2018 | Bogdan | G06F 16/285 |
| 2018/0268298 A1* | 9/2018 | Johansen | G06V 10/82 |
| 2019/0163804 A1* | 5/2019 | Linton | G06F 16/951 |
| 2019/0370394 A1* | 12/2019 | Li | G06N 3/082 |
| 2022/0180068 A1* | 6/2022 | Sahayaraj | G06F 40/166 |

* cited by examiner

*Primary Examiner* — Athar N Pasha
(74) *Attorney, Agent, or Firm* — Law Office of Ilya Libenzon

(57) ABSTRACT

Present disclosure describes techniques for determining document bias in a document set. The techniques include the step of receiving a document set comprising a plurality of documents, applying a Natural Language Processing (NLP) technique to the document set to identify one or more prevalent concepts in each document of the plurality of documents, and categorizing one or more concepts as a high prevalence concept and a low prevalence concept based on one or more parameters. The techniques further include the step of identifying one or more low prevalence concepts with negative sentiment and comparing the identified concepts with a plurality of keyword to determine at least one bias document/concept in the document set.

17 Claims, 7 Drawing Sheets

SYSTEM AND METHOD FOR DETERMINING BIAS CONCEPT/DOCUMENT IN A SET OF DOCUMENTS

FIELD OF INVENTION

The present disclosure relates to natural language processing and more particularly to a system and a method for determining bias concept/document in a set of documents.

BACKGROUND

In today's busy world, users find themselves bombarded with information that often is not relevant or interesting to them. With the pervasiveness of the Internet, a vast amount of information sourced from all forms of web-based media services exposes the users to what is culminated as an information overload, causing difficulty for a person to understand or digest the information. Indeed, many individuals nowadays simply have too many Tweets, Facebook posts, local event listings and news sites available, and not enough time to read them all in a meaningful way.

Natural language processing (NLP) systems have been extensively used in text mining including information extraction, topic models, text summarisation, classification, clustering, and opinion mining, etc. Big Data is having massive impacts on scientific findings and value creation. NLP and Big Data analytics can work together and form powerful systems for handling Big Data at massive scales to determine knowledge, perform text analysis and opinion mining, and facilitate decision-making for business and management.

Document processing operations such as automatic classification or topic labelling, document retrieval based on a query or representative document, or so forth, typically employ a so-called "bag of words" (BOW) representation. The BOW representation is typically computed for documents of a set of documents, and is a vector in which each dimension corresponds to a particular term (i.e., word) occurring in the set of documents, and the value stored for each dimension corresponds to the frequency of occurrence of that word in the document.

Mathematical conversions of such vectors can enable a textual search algorithm to seek out substitutes and related phrases for a search query, enabling a user to navigate the incredibly vast corpus of text available electronically on the internet and in collections of eBooks and other documents.

Most users of the internet have benefitted from such algorithms, albeit unconsciously. Marketers have been able to find thousands of opinions concerning products, scattered among hundreds of millions of documents on various subjects, and compile them in intuitively clear ways, making reading any particular document almost unnecessary.

However, there exist a chance that a concept/term is not frequently mentioned in the document but may be important from the perspective of identifying bias document/concept. The bias concepts generally are not quite frequently mentioned in the document and thus may be treated as least relevant by above conventional techniques.

For the aforementioned reasons, there exist a need in the art to provide a technique which overcomes the above-mentioned problems and provides an efficient and effective system and method for determining bias concept/document in a set of documents.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In one non-limiting aspect of the present disclosure, a method of determining at least one document bias in a document set is disclosed. The method comprises receiving a document set comprising a plurality of documents, applying a Natural Language Processing (NLP) technique to the document set to identify one or more prevalent concepts in each document of the plurality of documents, and categorizing one or more concepts as a high prevalence concept and a low prevalence concept based on one or more parameters. The method further includes identifying one or more low prevalence concepts with negative sentiment and comparing the identified concepts with a plurality of keyword to determine at least one bias document/concept in the document set.

In another non-limiting aspect of the present disclosure, the one or more parameters comprises number of occurrences of a concept in a document, number of occurrences of a concept in a document set, and a context of document.

In another non-limiting aspect of the present disclosure, wherein the one or more concepts comprises a term or a predetermined number of terms.

In yet another non-limiting aspect of the present disclosure, the identifying one or more low prevalence concepts with negative sentiment comprise determining a concept window around the one or more low prevalence concepts, the concept window indicating a number of terms on the left-hand side and the right-hand side of the concept, extracting a text for each of the one or more low prevalence concepts based on the concept window, and providing the extracted text of each low prevalence concept to a pre-trained model to determine the one or more low prevalence concepts with negative sentiment.

In yet another non-limiting aspect of the present disclosure, the method further comprises storing the at least one determined bias document/concept in a memory.

In yet another non-limiting aspect of the present disclosure, wherein the document set comprise at least one of: email communications, word processor documents, portable document files, or a combination thereof.

In yet another non-limiting aspect of the present disclosure, the method further comprises receiving a plurality of terms along with a respective sentiment associated with each term and training a model with the plurality of terms and the respective sentiment associated with each term.

In yet another non-limiting aspect of the present disclosure, the method further comprises reviewing the determined at least one bias document/concept present in the document set, determining whether the determined at least one bias document/concept is a false positive, and adding the at least one bias document/concept to an unbiased list if the false positive is determined.

In yet another non-limiting aspect of the present disclosure, a computing system for determining document bias in a document set is disclosed. The computing system comprises a memory for storing a plurality of instructions, and a processing unit in communication with the memory capable of executing the plurality of instructions. The computing system further comprises an input interface in communication with the memory and the processing unit. The input interface configured to receive a document set comprising a plurality of documents. The processing unit is configured to apply a Natural Language Processing (NLP) technique to the document set to identify one or more prevalent concepts in each document of the plurality of documents, categorize one or more concepts as a high prevalence concept and a low prevalence concept based on one or more parameters, identify one or more low prevalence concepts with negative sentiment, and compare the identified concepts with a plurality of keyword to determine at least one bias document/concept.

In yet another non-limiting aspect of the present disclosure, the processing unit is configured to categorize one or more concepts as a high prevalence concept and a low prevalence concept based on at least one of: a number of occurrences of a concept in a document, a number of occurrences of a concept in a document set, and a context of document.

In yet another non-limiting aspect of the present disclosure, the one or more concepts comprises a term or a predetermined number of terms.

In yet another non-limiting aspect of the present disclosure, to identify one or more low prevalence concepts with negative sentiment, the processing unit is configured to determine a concept window around the one or more low prevalence concepts, wherein the concept window indicates a number of terms on the left-hand side and the right-hand side of the concept, extract a text for each of the one or more low prevalence concepts based on the concept window, and provide the extracted text of each low prevalence concept to a pre-trained model to determine the one or more low prevalence concepts with negative sentiment.

In yet another non-limiting aspect of the present disclosure, the processing unit is configured to store the at least one determined bias document/concept in the memory.

In yet another non-limiting aspect of the present disclosure, the input interface is further configured to receive a plurality of terms along with a respective sentiment associated with each term, and the processing unit is configured to train a model with the plurality of terms and the respective sentiment associated with each term.

In yet another non-limiting aspect of the present disclosure, the computing system further comprise a monitoring unit configured to review the determined at least one bias document/concept present in the document set, determine whether the determined at least one bias document/concept is a false positive, and add the at least one bias document/concept to an unbiased list if the false positive is determined.

In yet another non-limiting aspect of the present disclosure, a non-transitory computer-readable medium having computer-readable instructions is disclosed. The computer-readable instructions when executed by a processor causes the processor to perform operations of obtaining a document set comprising a plurality of documents, applying a Natural Language Processing (NLP) technique to the document set to identify one or more prevalent concepts in each document of the plurality of documents, categorizing one or more concepts as a high prevalence concept and a low prevalence concept based on one or more parameters, identifying one or more low prevalence concepts with negative sentiment, and comparing the identified concepts with a plurality of keyword to determine at least one bias document/concept.

The foregoing summary is illustrative only and is not intended to be in any way limiting. In addition to the illustrative aspects, and features described above, further aspects, and features will become apparent by reference to the drawings and the following detailed description.

BRIEF DESCRIPTION OF DRAWINGS

The accompanying drawings, which are incorporated in and constitute a part of this disclosure, illustrate exemplary aspects and, together with the description, serve to explain the disclosed principles. Some aspects of system and/or methods in accordance with aspects of the present subject matter are now described, by way of example only, and with reference to the accompanying Figures, in which.

Figure 1:
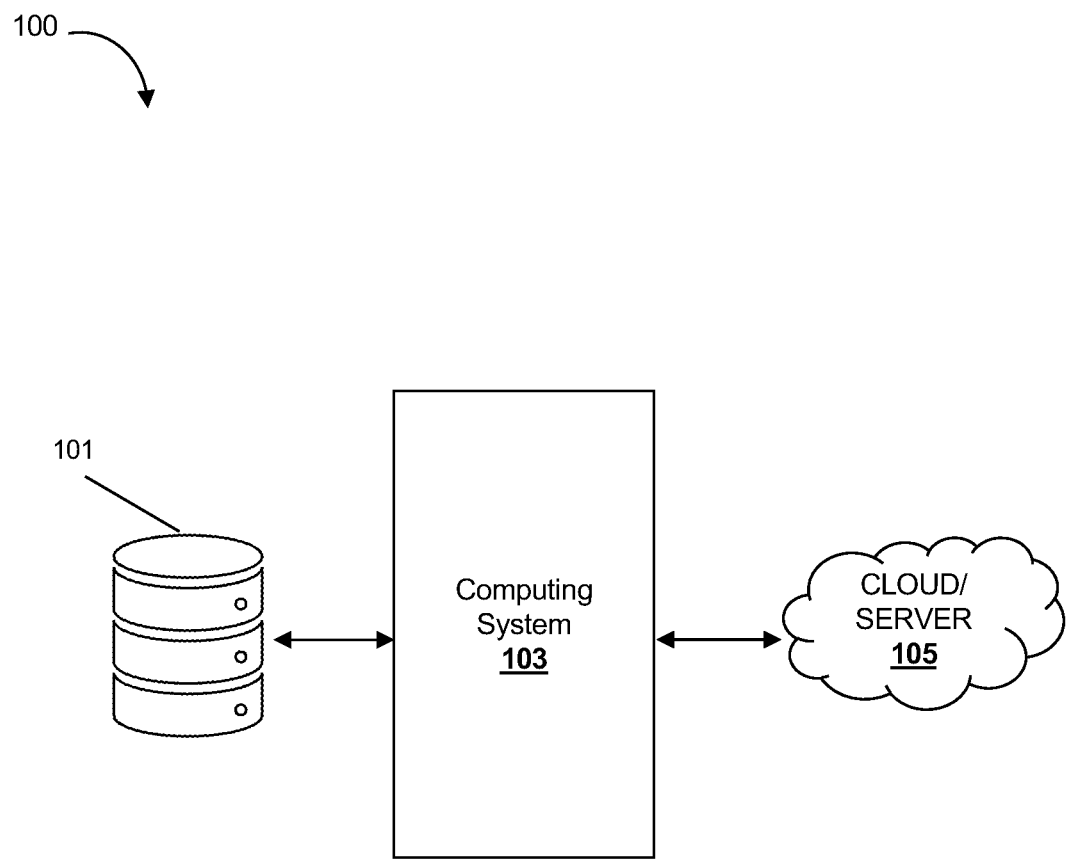
FIG. 1 shows an exemplary environment for determining bias concept/document in a set of documents, in accordance with an aspect of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the aspects of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the aspect illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any aspect or implementation of the present subject matter described herein as "exemplary" is not necessarily to be construed as preferred or advantageous over other aspects.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an aspect", "in another aspect" and similar language throughout this specification may, but not necessarily do, all refer to the same aspect.

Unless otherwise defined, all technical and scientific terms used herein have the same meaning as commonly understood by those skilled in the art to which this disclosure belongs. The system, methods, and examples provided herein are only illustrative and not intended to be limiting. A computer system (standalone, client or server computer system) configured by an application may constitute a "module" (or "subsystem") that is configured and operated to perform certain operations. In one aspect, the "module" or "subsystem" may be implemented mechanically or electronically, so a module includes dedicated circuitry or logic that is permanently configured (within a special-purpose processor) to perform certain operations. In another aspect, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

The terms "relevance" and "prevalence" have the same meaning and have been alternatively used throughout the entire specification.

The terminology "ML model", "ML module", and "pre-trained model" have the same meaning and have been alternatively used throughout the entire specification.

Present disclosure describes techniques for determining document bias in a document set. The techniques include the step of receiving a document set comprising a plurality of documents, applying a Natural Language Processing (NLP) technique to the document set to identify one or more prevalent concepts in each document of the plurality of documents, and categorizing one or more concepts as a high prevalence concept and a low prevalence concept based on one or more parameters. The techniques further include the step of identifying one or more low prevalence concepts with negative sentiment and comparing the identified concepts with a plurality of keyword to determine at least one bias document/concept.

Thus, the above-mentioned technique helps in identification of the bias concept/document in a set of documents that are less relevant, thereby facilitating finding of unpopular words/concept with negative sentiments.

FIG. 1 shows an exemplary environment 100 for determining bias concept/document in a set of documents, in accordance with an aspect of the present disclosure.

The environment 100 may comprise a database 101, a computing system 103, and a cloud/server 105 in communication with each other over a communication network. The communication network may be the internet, intranet, a local area network (LAN), a wide area network (WAN), wireless LAN (WLAN), wireless fidelity (Wi-Fi), and similar networks.

In one non-limiting aspect, the computing system 103 may comprise mobile phone, smart phone, mobile node, radio terminal, personal digital assistant, tablet computer, laptop computer, or the like with communication capabilities. However, the computing system 103 and are not limited to above example and a person skilled in the art may select any other device/system with similar capabilities.

In an aspect of the present disclosure, the database 101 may be a repository of documents. The database 101 may be operable to store a plurality of documents. The documents may comprise one or more of email communications, word processor documents, portable document files, or a combination thereof. However, the document type is not limited to above example and a person skilled in the art may select any document hat may comprise text for analysis.

In an aspect, the computing system 103 may be operable to retrieve a set of documents comprising a number of documents from the database 101. The computing system 103 may be then operable to process the plurality of documents and identify the relevance of terms or concepts present in the each of the documents. The relevance of terms or concepts may be carried out through any of the Natural Language Processing (NLP) technique/algorithm known to a person skilled in the art.

In an aspect, the computing system 103 may then determine low relevance concept/term with negative sentiments and flag such concepts/documents with any bias terminology. The relevance calculation, bias terms/keywords, and negative sentiment identification is discussed in detail in below aspects.

In an aspect of the present disclosure, the computing system 103 may transmit the flagged biased concept/documents to server/cloud 105 over the communication network discussed above. The cloud/server 105 may be configured to store the biased concept/documents in the memory. In one non-limiting aspect, the cloud/server may comprise a monitoring or administration unit to monitor one or more falsely detected bias document/concepts and store such falsely detected bias document/concept in a separate un-bias list for future reference.

Thus, the computing system 103 facilitates identification of the bias concepts/documents in a set of documents that are less relevant, thereby finding unpopular words/concept with negative sentiments.

Figure 2:
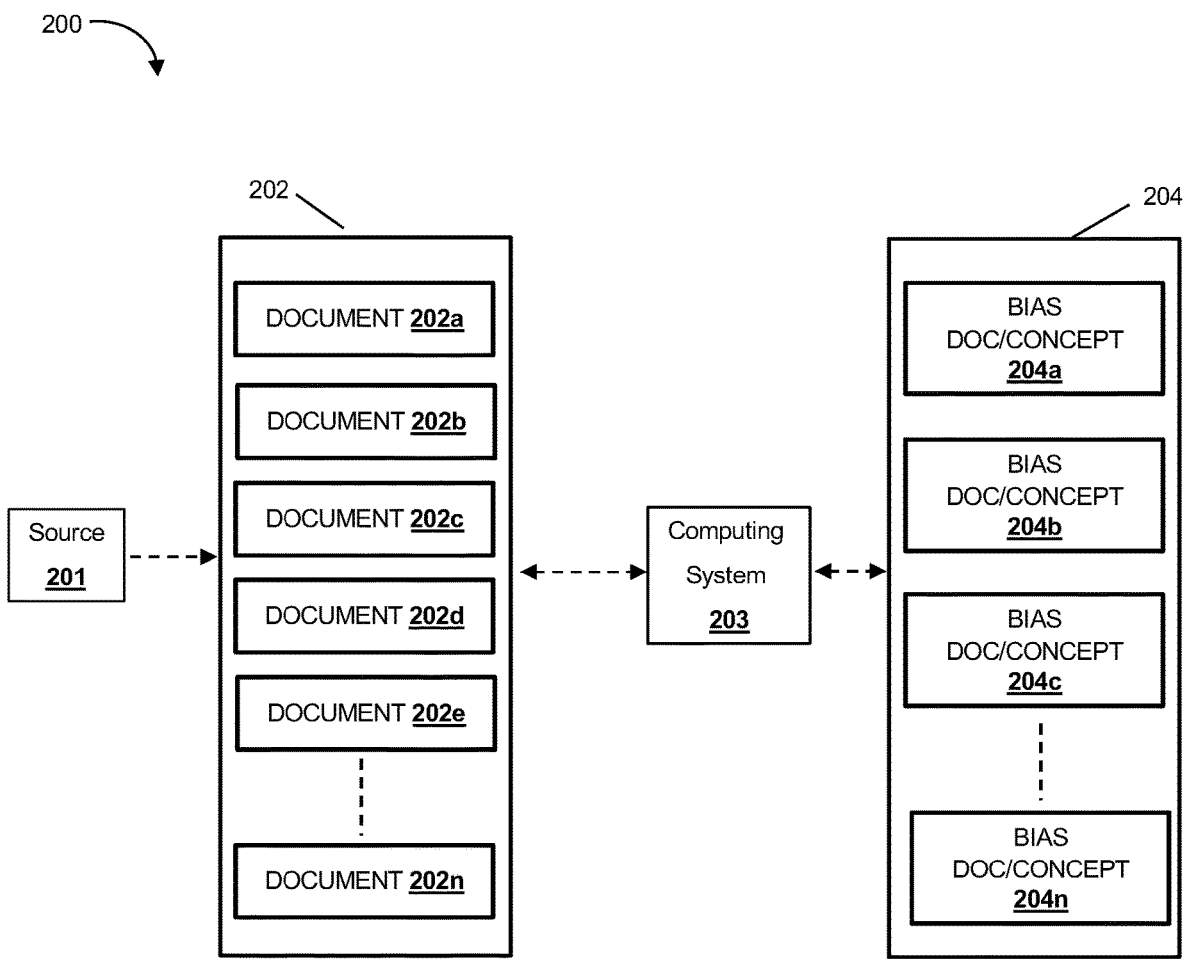
FIG. 2 illustrates an exemplary communication environment between a data source and a computing system for determining bias concept/document, in accordance with some aspects of the present disclosure.

FIG. 2 illustrates an exemplary communication environment 200 between a data source 201 and a computing system 203 for determining bias concept/document, in accordance with some aspects of the present disclosure.

In an aspect of the present disclosure, the data source or source 201 may comprise a set of documents including a plurality of documents 202a, 202b, 202c, . . . 202n. The computing system 203 is similar to that of the computing system 103 as discussed in above aspects. The computing system 203 may also be in communication with cloud or server as discussed in above aspect.

The computing system 203 may be then operable to process the plurality of documents 202a, 202b, 202c, . . . 202n and apply Natural Language Processing (NLP) technique/algorithm to determine/identify one or more prevalent concepts/terms present in the each of the documents. In one non-limiting aspect, each prevalence concept may comprise only a single word/term that determine one of the contexts of the document. In another non-limiting aspect, each prevalence concept may comprise a sequence of terms that defines one of the contexts of the document. The number of terms in the sequence of terms may be predefined/predetermined.

In an aspect of the present disclosure, each prevalence concept/term may have a respective prevalence score that may be calculated based on a frequency of occurrence of each prevalence concept/term in a document or a subset of documents. In one non-limiting aspect, the prevalence concept/term may have a respective prevalence score that may be calculated based on frequency of occurrence of each prevalence concept/term in a document and a context of the document.

In an aspect, the prevalence concept may be sorted in an order of relevance/prevalence. The prevalence concept with low prevalence score may be at the top of a list and the prevalence concept with high prevalence score may be present at the bottom of such list. The computing system 203 may then apply any sentiment analysis algorithm/technique known to person skilled in the art to identify a sentiment associated with each of the low prevalence concept/term. In one non-limiting aspect, the sentiment analysis algorithm/technique may be "roBerta model" that may be pre-trained with a plurality of terms and their respective sentiment associated with each term.

However, the pre-trained model is not limited to above example and a person skilled in the art may use any other pre-trained model capable of identifying a sentiment associated with prevalence concepts/terms.

In an aspect, the computing system 203 may determine low relevance concept/term with negative sentiments using the pre-trained model. The computing system 203 may then compare low relevance concept/term having negative sentiment with a plurality of bias keywords/terms to identify the bias concepts 204a, 204b, 204c, . . . 204n with any bias terminology. The plurality of bias keywords/terms may comprise a list of common bias terms (man, woman, black, white, old guy, girl, gay, rainbow, etc.,). In one non-limiting aspect, the list of common bias terms may be modified based on a preference of a user.

The bias concepts or a document 204a, 204b, 204c, . . . 204n comprising the bias concepts may be flagged and then stored in the memory of the computing system 203. In another aspect of the present disclosure, the computing system 203 may transmit the flagged biased concept/documents to server/cloud over the communication network discussed above. The cloud/server 105 may be configured to store the biased concept/documents in the memory.

Thus, the computing system 203 facilitates identification of the bias concepts/documents in a set of documents that are less relevant, thereby finding unpopular words/concept with negative sentiments.

Figure 3:
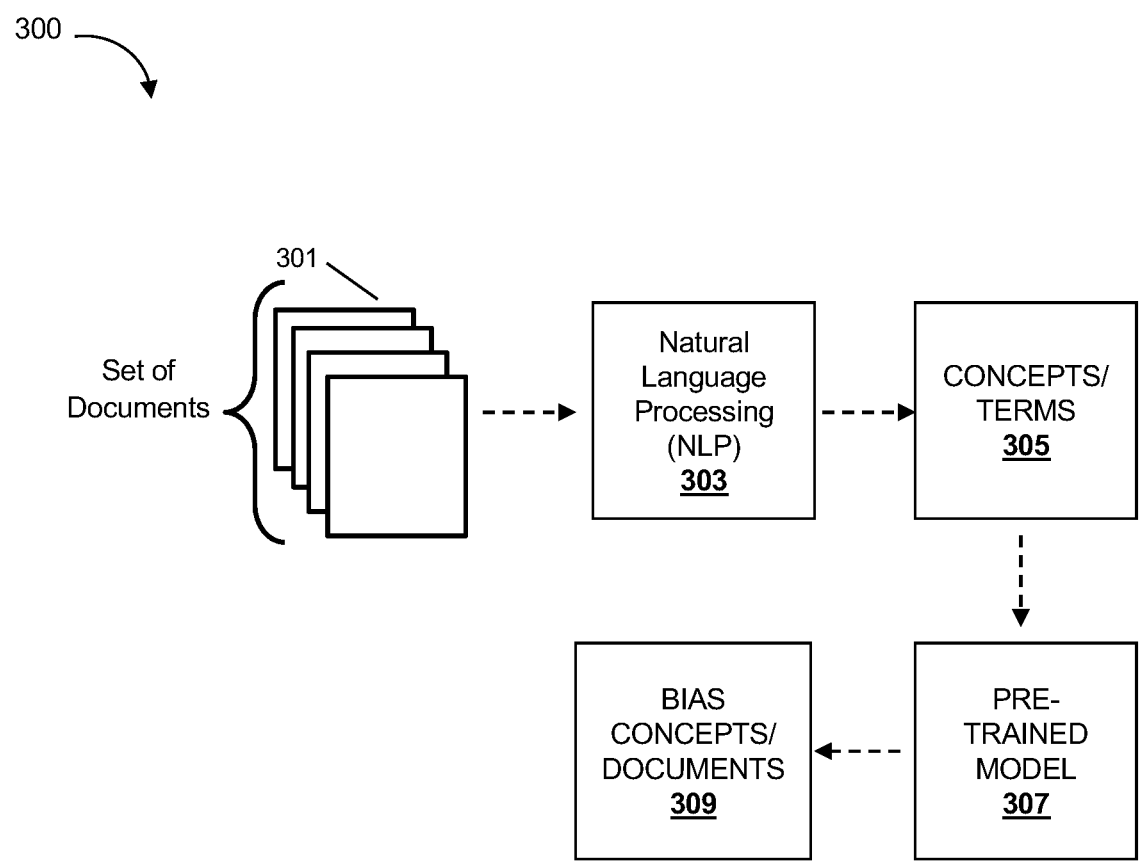
FIG. 3 is a block diagram illustrating an exemplary data flow for determining bias concept/document, in accordance with an aspect of the present disclosure.

FIG. 3 is a block diagram illustrating an exemplary data flow for determining bias concept/document, in accordance with an aspect of the present disclosure.

In an aspect of the present disclosure, a set of documents 301 comprising a plurality of documents are fetched or retrieved from a database/repository remotely or locally located. The plurality of documents may be then provided to Natural Language Processing (NLP) technique/algorithm 303. in order to determine/identify one or more prevalent concepts/terms 305 present in the each of the documents.

In one non-limiting aspect, each prevalence concept 305 may comprise only a single word/term that determine one of the contexts of the document. In another non-limiting aspect, each prevalence concept 305 may comprise a sequence of terms that defines one of the contexts of the document. The number of terms in the sequence of terms may be pre-defined/predetermined.

In one non-limiting aspect, each prevalence concept/term 305 may be defined as follows:

Prevalence may be defined as how relevant/important a term is in a set of documents. If a term appears often in your documents, then it should be more relevant (because it's an interesting thing that the data is talking about), but maybe not if it occurs too often (if all your documents are about email, then people might use the word "email" a lot but it doesn't tell you much because everything in the project is about email), and it should be less relevant if it also occurs all the time outside your documents (like "get").

In one non-limiting aspect, prevalence in a subset, may be a number of documents the term occurs in in the subset i.e., "distinct_doc_count" approximately, the proportion of all documents that the term occurs in i.e., inverse document frequency (IDF), and the frequency of the term in a background word list i.e., wordlist frequency.

$$\text{distinct\_doc\_count(term)} = \text{total number of documents that term occurs in} \quad (1)$$

$$\text{distinct\_doc\_count(term,subset)} = \text{number of documents that term occurs in the subset} \quad (2)$$

$$\text{doc\_count(subset)} = \text{number of documents in subset} \quad (3)$$

It is to be noted that there are different possible ways of measuring how often a term occurs i.e., using the number of documents it occurs in or number of times it occurs, which would allow the same term to be counted multiple times per document.

In an aspect, the prevalence concept 305 may be sorted in an order of relevance/prevalence. The prevalence concept 305 with low prevalence score may be at the top of a list and the prevalence concept 305 with high prevalence score may be present at the bottom of such list. The low prevalence concept out of the prevalence concepts 305 may be then provided to a pre-trained model 307 for sentiment analysis algorithm/technique to identify a sentiment associated with each of the low prevalence concept/term. In one non-limiting aspect, the sentiment analysis algorithm/technique may be "roBerta model" that may be pre-trained with a plurality of terms and their respective sentiment associated with each term.

However, the pre-trained model 307 is not limited to above example and a person skilled in the art may use any other pre-trained model 307 capable of identifying a sentiment associated with prevalence concepts/terms 305. Thus, the low relevance concept/term having negative sentiments are identified or determined using the pre-trained model.

The low relevance concept/term having negative sentiment are compared with a plurality of bias keywords/terms to identify the bias concepts/documents 309 with any bias terminology. The plurality of bias keywords/terms may comprise a list of common bias terms (man, woman, black, white, old guy, girl, gay, rainbow, etc.,). In one non-limiting aspect, the list of common bias terms may be modified based on a preference of a user.

The bias concepts or a document 309 comprising the bias concepts may be flagged and then stored in the memory. In another aspect of the present disclosure, the flagged biased concept/documents to server/cloud over the communication network discussed above. The cloud/server may be configured to store the biased concept/documents.

Thus, the above-mentioned identification of the bias concepts/documents in a set of documents that are less relevant facilitates finding unpopular words/concept with negative sentiments in a set of documents 301.

Figure 4:
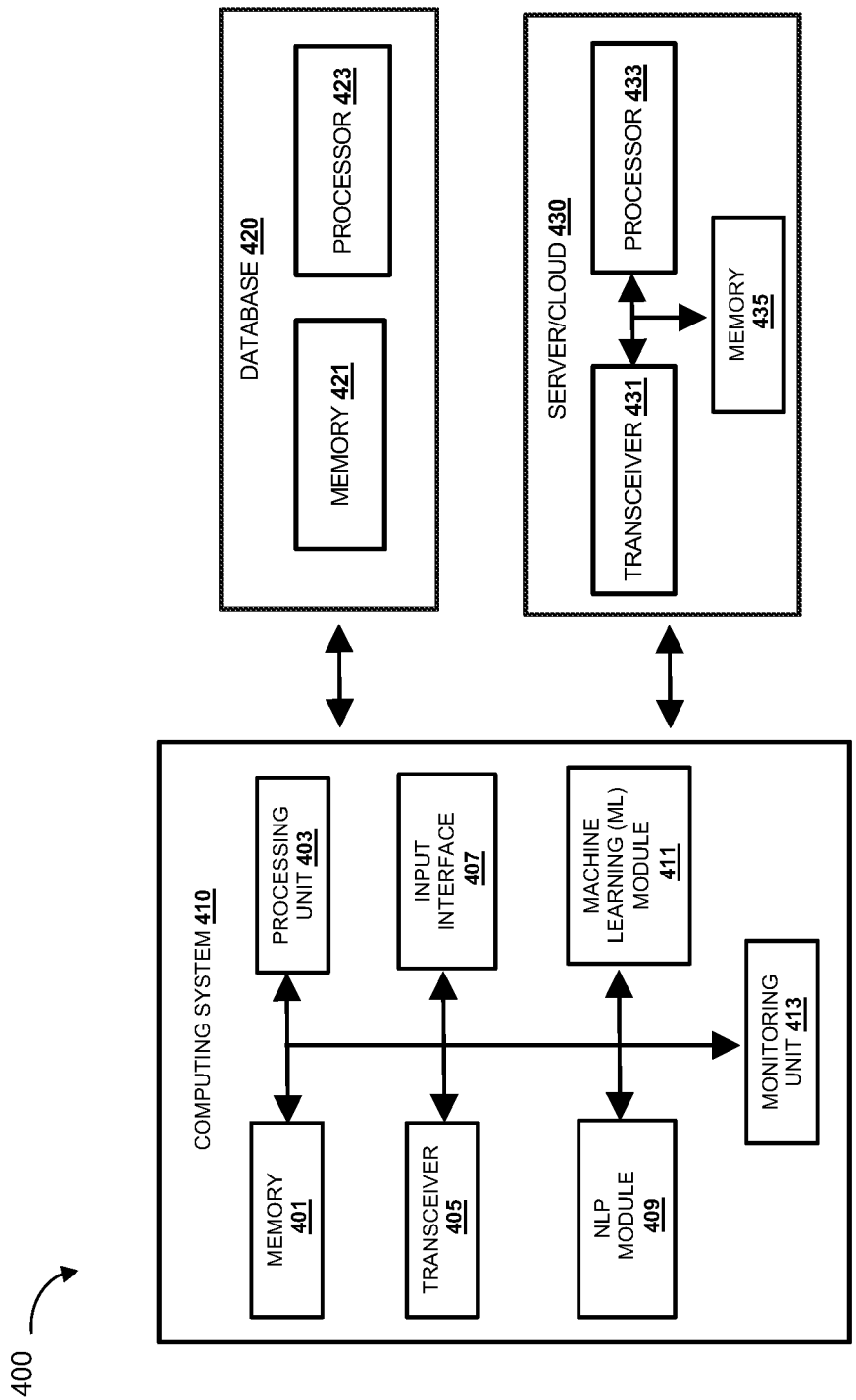
FIG. 4 is a block diagram illustrating a system for determining bias concept/document in a set of documents, in accordance with an aspect of the present disclosure.

FIG. 4 is a block diagram illustrating a system 400 for determining bias concept/document in a set of documents, in accordance with an aspect of the present disclosure.

In an aspect of the present disclosure, the system 400 may comprise a computing system 410, a database 420, and server/cloud 430 communicatively connected with each other over a communication network. In one non-limiting aspect, the communication network may be may be the internet, intranet, a local area network (LAN), a wide area network (WAN), wireless LAN (WLAN), wireless fidelity (Wi-Fi), and similar networks. In one non-limiting aspect, the database 420 may be integrated with the computing system 410 through an input interface of the computing system 410.

In an aspect of the present disclosure, the computing system 410 may comprise memory 401, processing unit 403, a transceiver 405, an input interface 407, an NLP module 409, a machine learning module (ML) 411, and a monitoring unit 413 in communicatively coupled with each other. The database 420 may comprise a memory 421 and a processor 423 in communication with each other. The server/cloud 430 may comprise a transceiver 431, a processor 433, and a memory 435 in communication with each other.

However, the hardware/software components of the computing system 410, database 420, and server/cloud 430 are not limited to above mentioned components and the computing system 410, database 420, and server/cloud 430 may comprise any other component required to carry out their respective functionalities.

In an aspect of the present disclosure, the memory 401 of the computing system 410 may be operable/configured for storing a plurality of instructions. The processing unit 403 may be in communication with the memory 401 may be capable of executing a plurality of instructions. The input interface may be configured to receive a document set comprising a plurality of documents.

The documents may comprise one or more of email communications, word processor documents, portable document files, or a combination thereof. However, the document type is not limited to above example and a person skilled in the art may select any document that may comprise text for analysis.

In an aspect of the present disclosure, the processing unit 403 may be configured to apply a Natural Language Processing (NLP) technique to the document set to identify one or more prevalent concepts in each document of the plurality of documents. The Natural Language Processing (NLP) technique may be one of, but not limited to, NLP techniques known to a person skilled in art.

In an aspect of the present disclosure, the NLP technique may be applied to identify one or more prevalent concepts/terms in the set of documents. the one or more concepts comprises a term or a predetermined number of terms. The processing unit 403 may be configured to categorize one or more concepts as a high prevalence concept and a low prevalence concept based on one or more parameters, as discussed in above aspects. In one non-limiting aspect, the categorization may be done on the basis of prevalence score calculated using equations (1)-(3).

In another non-limiting aspect, the processing unit 403 may be configured to categorize one or more concepts as a high prevalence concept and a low prevalence concept based on at least one of a number of occurrences of a concept in a document, a number of occurrences of a concept in a document set, and a context of document.

In an aspect, the processing unit 403 may then be configured to identify one or more low prevalence concepts with negative sentiment. The processing unit 403 may be configured to provide the one or more low prevalence concepts to the ML module 411, which is pre-trained by the processing unit 403 with plurality of terms along with the associated sentiment with each word.

In an aspect, to identify one or more low prevalence concepts with negative sentiment, the processing unit 403 may be configured determine a concept window around the one or more low prevalence concepts. The concept window indicates a number of terms on the left-hand side and the right-hand side of the concept. The size of the concept window may be predetermined. The processing unit 403 may be configured to extract a text for each of the one or more low prevalence concepts based on the concept window and provide the extracted text of each low prevalence concept to a pre-trained model to determine the one or more low prevalence concepts with negative sentiment.

The pre-trained ML module 411 may take the one or more low prevalence concepts and compare those concepts with the plurality of terms each having associated sentiment to identify one or more low prevalence concepts with negative sentiment. Thus, the pre-trained ML module 411 may filter out only those low prevalence concepts which have the negative sentiment.

In one non-limiting aspect, the pre-trained ML module 411 may be pre-trained by the processing unit 403 with plurality of terms along with the associated sentiment with each word and the pre-trained ML module 411 may filter out the one or more low prevalence concepts with positive sentiment.

In an aspect, the processing unit 403 may be configured to compare low relevance concept/term having negative sentiment with a plurality of bias keywords/terms to identify the bias concepts with any bias terminology. The plurality of bias keywords/terms may comprise a list of common bias terms (man, woman, black, white, old guy, girl, gay, rainbow, etc.,). In one non-limiting aspect, the list of common bias terms may be modified based on a preference of a user or based on domain or field to which the set of documents belong.

The bias concepts or documents comprising the bias concepts may be flagged and then stored in the memory 401 of the computing system 410. In another aspect of the present disclosure, the computing system 410 may transmit the flagged biased concept/documents to server/cloud 430 over the communication network discussed above. The cloud/server 430 may be configured to store the biased concept/documents in the memory 435 of the cloud/server 430.

Thus, the computing system 410 facilitates identification of the bias concepts/documents in a set of documents that are less relevant, thereby finding unpopular words/concept with negative sentiments.

In an aspect, the monitoring unit 413 may be configured to review the determined at least one bias document/concept and then determine whether the determined at least one bias document/concept is a false positive. If the false positive is determined, the monitoring unit 413 may be configured to add the at least one bias document/concept to an unbiased list. The monitoring unit 413 may then store the remaining of the bias documents/concepts in a bias list for future reference.

In one non-limiting aspect, the unbiased list may be used to train the ML module 411 and the ML module 411 may eliminate such false positive from the one bias document/concept automatically. Thus, the computing system 410 facilitates identification of the bias concepts/documents in a set of documents that are less relevant, thereby finding unpopular words/concept with negative sentiments without any false positives.

Figure 5:
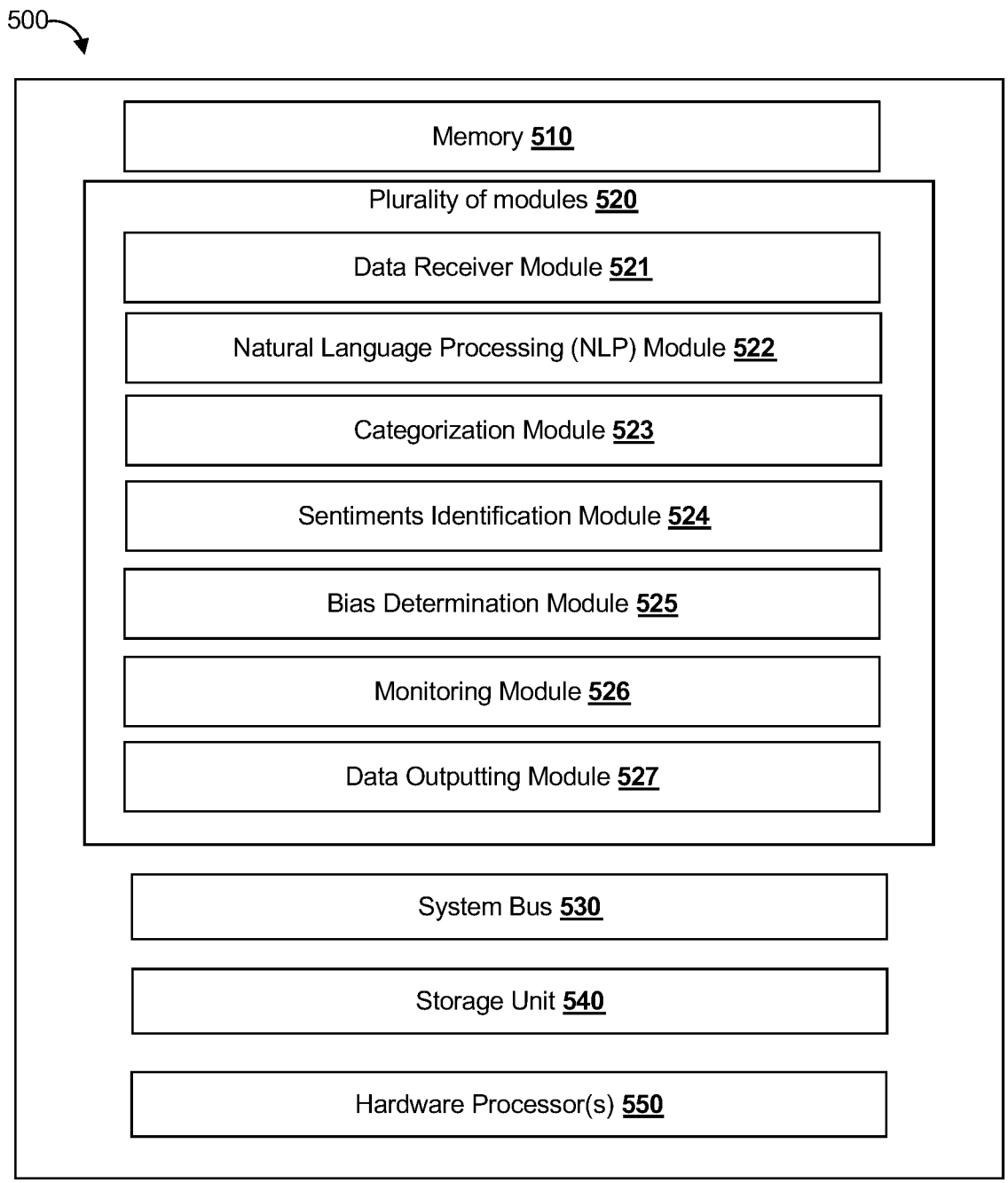
FIG. 5 is a block diagram illustrating a computing system for determining bias concept/document in a set of documents, in accordance with an aspect of the present disclosure.

FIG. 5 is a block diagram illustrating a computing system 500 for determining bias concept/document in a set of documents, in accordance with an aspect of the present disclosure.

In an aspect of the present disclosure, the computing system 500 may be similar to the computing system 103, 203, and 410 discussed in above aspects. The computing system 500 may comprise a memory 510, a storage unit 540, and one or more hardware processors 550. The memory 510, the storage unit 540, and one or more hardware processors 550 are communicatively coupled through a system bus 530 or any similar mechanism. The computing system 500 may further comprise a plurality of modules 520. The plurality of modules 520 includes a data receiver module 521, a Natural Language Processing (NLP) module 522, a categorization module 523, a sentiment identification module 524, a bias determination module 525, a monitoring module 526, and a data outputting module 527.

In one non-limiting aspect, the plurality of modules 520 may be stored in the memory 510 in the form of programmable instructions left off here executable by the one or more hardware processors 550. In another non-limiting aspect, each of the plurality of modules 520 may have their respective specific hardware circuitry required for carrying out the below mentioned functionalities.

The one or more hardware processors 550, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 550 may also include embedded controllers, such as generic or programmable logic devices or arrays, application specific integrated circuits, single-chip computers, and the like.

The memory 510 may be non-transitory volatile memory and non-volatile memory. The memory 510 may be coupled for communication with the one or more hardware processors 550 and the plurality of modules 520, such as being a computer-readable storage medium. The one or more hardware processors 550 may execute machine-readable instructions and/or source code stored in the memory 510. A variety of machine-readable instructions may be stored in and accessed from the memory 510. The memory 510 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present aspect, the memory 204 includes the plurality of modules 520 stored in the form of machine-readable instructions on any of the above-mentioned storage media and may be in communication with and executed by the one or more hardware processors 550.

The storage unit 540 may be a cloud storage or a local file directory within a remote server. The storage unit 540 may store consumer details including Personal Identifiable Information (PII) of the consumer. The PII may be the information used to identify the consumer, such as name and contact information of the consumer. Further, the storage unit 540 also stores food menu of the restaurant, previous food orders received from the consumer, the predefined food order information and security code generated corresponding to the food order.

In an aspect of the present disclosure, the data receiver module 521 may be configured to receive a document set comprising a plurality of documents. The documents may comprise one or more of email communications, word processor documents, portable document files, or a combination thereof. However, the document type is not limited to above example and a person skilled in the art may select any document that may comprise text for analysis.

In an aspect of the present disclosure, the NLP module 522 may be configured to apply a Natural Language Processing (NLP) technique to the document set to identify one or more prevalent concepts in each document of the plurality of documents. The Natural Language Processing (NLP) technique may be one of, but not limited to, NLP techniques known to a person skilled in art. In an aspect of the present disclosure, the NLP technique may be applied to identify one or more prevalent concepts/terms in the set of documents. the one or more concepts comprises a term or a predetermined number of terms.

The categorization module 523 may be configured to categorize one or more concepts as a high prevalence concept and a low prevalence concept based on one or more parameters, as discussed in above aspects. In one non-limiting aspect, the categorization may be done on the basis of prevalence score calculated using equations (1)-(3).

In another non-limiting aspect, the categorization module 523 may be configured to categorize one or more concepts as a high prevalence concept and a low prevalence concept based on at least one of a number of occurrences of a concept in a document, a number of occurrences of a concept in a document set, and a context of document.

In an aspect, the sentiment identification module 524 may then be configured to identify one or more low prevalence concepts with negative sentiment. The sentiment identification module 524 may be pre-trained with plurality of terms along with the associated sentiment with each word.

In an aspect, to identify one or more low prevalence concepts with negative sentiment, the sentiment identification module 524 may be configured determine a concept window around the one or more low prevalence concepts. The concept window indicates a number of terms on the left-hand side and the right-hand side of the concept. The size of the concept window may be predetermined. The sentiment identification module 524 may be configured to extract a text for each of the one or more low prevalence concepts based on the concept window and provide the extracted text of each low prevalence concept to determine the one or more low prevalence concepts with negative sentiment.

The sentiment identification module 524 may compare the one or more low prevalence concepts with the plurality of terms and the associated sentiments to identify one or more low prevalence concepts with negative sentiment. Thus, the sentiment identification module 524 may filter out the one or more low prevalence concepts with negative sentiment.

In one non-limiting aspect, the sentiment identification module 524 may be pre-trained by a processing unit with plurality of terms along with the associated sentiment with each word and the sentiment identification module 524 may filter out the one or more low prevalence concepts with positive sentiment.

In an aspect, the bias determination module 525 may then configured to compare low relevance concept/term having negative sentiment with a plurality of bias keywords/terms to identify the bias concepts with any bias terminology. The plurality of bias keywords/terms may comprise a list of common bias terms (man, woman, black, white, old guy, girl, gay, rainbow, etc.,). In one non-limiting aspect, the list of common bias terms may be modified based on a preference of a user or based on domain or field to which the set of documents belong.

The bias concepts or documents comprising the bias concepts may be flagged and then stored in the memory 510 of the computing system 500. The data outputting module 527 may be configured to display the bias concepts or documents to the user. In another aspect of the present disclosure, the computing system 500 may transmit the flagged biased concept/documents to server/cloud over the communication network discussed above. The cloud/server may be configured to store the biased concept/documents in the memory of the cloud/server.

Thus, the computing system 500 facilitates identification of the bias concepts/documents in a set of documents that are less relevant, thereby finding unpopular words/concept with negative sentiments.

In an aspect, the monitoring module 526 may be configured to review the determined at least one bias document/concept and then determine whether the determined at least one bias document/concept is a false positive. If the false positive is determined, the monitoring module 526 may be configured to add the at least one bias document/concept to an unbiased list. The monitoring module 526 may then store the remaining of the bias documents/concepts in a bias list for future reference.

In one non-limiting aspect, the unbiased list may be used to train a ML module and the ML module may eliminate such false positive from the one bias document/concept automatically. Thus, the computing system 500 facilitates identification of the bias concepts/documents in a set of documents that are less relevant, thereby finding unpopular words/concept with negative sentiments without any false positives.

Figure 6:
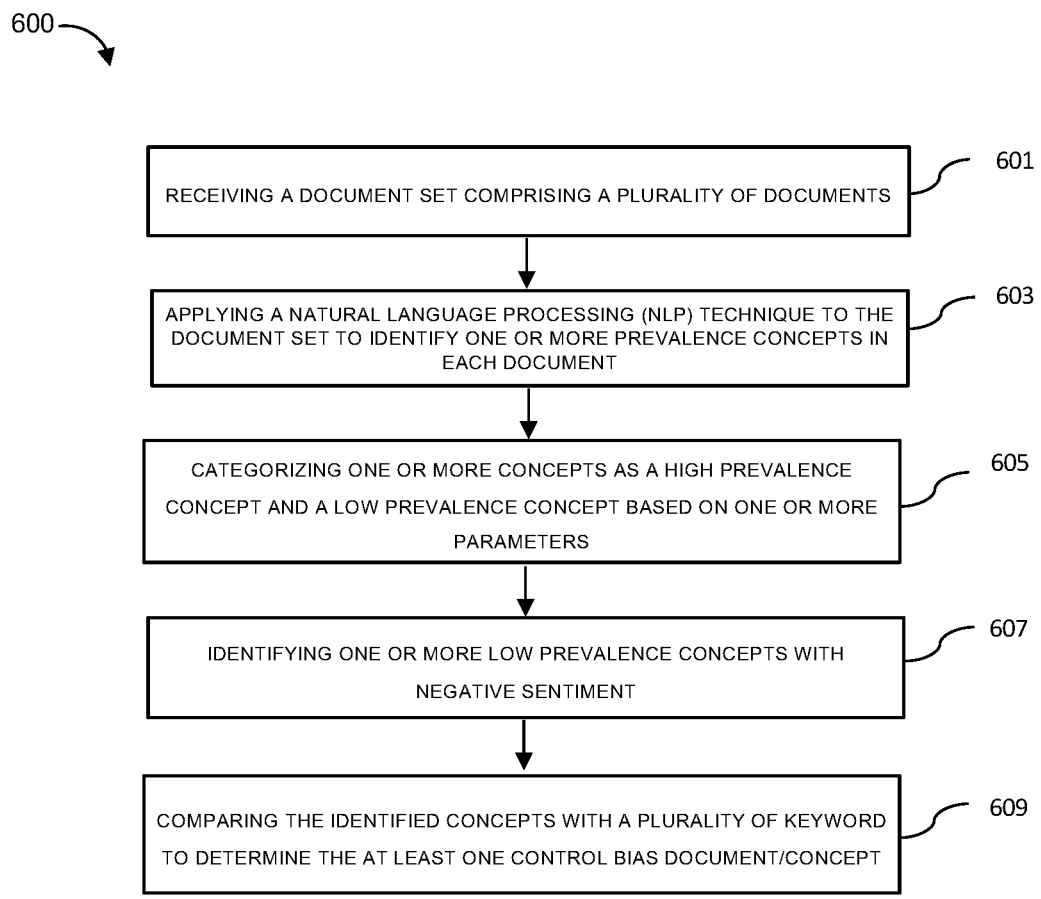
FIG. 6 depicts a flowchart illustrating an exemplary method of determining bias concept/document in a set of documents, in accordance with an aspect of the present disclosure.

FIG. 6 depicts a flowchart illustrating an exemplary method 600 of determining bias concept/document in a set of documents, in accordance with an aspect of the present disclosure.

At step 601, a document set comprising a plurality of documents are received from a user through selection or through a database. The documents may comprise one or more of email communications, word processor documents, portable document files, or a combination thereof. However, the document type is not limited to above example and a person skilled in the art may select any document that may comprise text for analysis.

At step 603, a Natural Language Processing (NLP) technique is applied to the document set to identify one or more prevalent concepts in each document of the plurality of documents. The Natural Language Processing (NLP) technique may be one of, but not limited to, NLP techniques known to a person skilled in art. In an aspect of the present disclosure, the NLP technique may be applied to identify one or more prevalent concepts/terms in the set of documents. the one or more concepts comprises a term or a predetermined number of terms.

At step 605, the one or more concepts may be categorized as a high prevalence concept and a low prevalence concept based on one or more parameters, as discussed in above aspects. In one non-limiting aspect, the categorization may be done on the basis of prevalence score calculated using equations (1)-(3).

In another non-limiting aspect, the categorization of the one or more concepts as a high prevalence concept and a low prevalence concept may be done based on at least one of a number of occurrences of a concept in a document, a number of occurrences of a concept in a document set, and a context of document.

At step 607, one or more low prevalence concepts having negative sentiment are identified. The one or more low prevalence concepts may be provided to the ML module (discussed above), which is pre-trained with plurality of terms along with the associated sentiment with each word. The training of the ML module includes receiving a plurality of terms along with a respective sentiment associated with each term and training the ML module with the plurality of terms and the respective sentiment associated with each term.

In an aspect, identifying the one or more low prevalence concepts with negative sentiment comprises determining a concept window around the one or more low prevalence concepts. The concept window indicates a number of terms on the left-hand side and the right-hand side of the concept. The size of the concept window may be predetermined. The identifying the one or more low prevalence concepts with negative sentiment further includes extracting a text for each of the one or more low prevalence concepts based on the concept window and provide the extracted text of each low prevalence concept to a pre-trained ML module to determine the one or more low prevalence concepts with negative sentiment.

The pre-trained ML module may take the one or more low prevalence concepts and compare those concepts with the plurality of terms each having an associated sentiment to identify one or more low prevalence concepts with negative sentiment. Thus, the pre-trained ML module may filter out only those low prevalence concepts which have the negative sentiment.

In one non-limiting aspect, the pre-trained ML module may be pre-trained with plurality of terms along with the associated sentiment with each word and the pre-trained ML module may filter out the one or more low prevalence concepts with positive sentiment. Thus, the pre-trained ML module helps in determining a sentiment associated with a concept.

At step 609, the low relevance concept/term having negative sentiment are compared with a plurality of bias keywords/terms to identify the bias concepts with any bias terminology. The plurality of bias keywords/terms may comprise a list of common bias terms (man, woman, black, white, old guy, girl, gay, rainbow, etc.). In one non-limiting aspect, the list of common bias terms may be modified based on a preference of a user or based on domain or field to which the set of documents belong.

The bias concepts or documents comprising the bias concepts may be flagged and then stored in the memory of the computing system. In another aspect of the present disclosure, the flagged biased concept/documents may be transmitted to the server/cloud over the communication network discussed above. The cloud/server may store the biased concept/documents in the memory of the cloud/server.

Thus, the method 600 facilitates identification of the bias concepts/documents in a set of documents that are less relevant, thereby finding unpopular words/concept with negative sentiments.

In an aspect, the method 600 may further comprise reviewing the determined at least one bias document/concept and then determining whether the determined at least one bias document/concept is a false positive. If the false positive is determined, the method 600 further describes adding the at least one bias document/concept to an unbiased list. Then the remaining of the bias documents/concepts are stored in a bias list for future reference.

In one non-limiting aspect, the unbiased list may be used to train the ML module or model and the ML model may eliminate such false positive from the one bias document/concept automatically. Thus, the method 600 facilitates identification of the bias concepts/documents in a set of documents that are less relevant, thereby finding unpopular words/concept with negative sentiments without any false positives.

The method 600 may be implemented in any suitable hardware, software, firmware, or combination thereof.

In another non-limiting aspect of the present disclosure, the steps of method 600 may be performed in an order different from the order described above.

Figure 7:
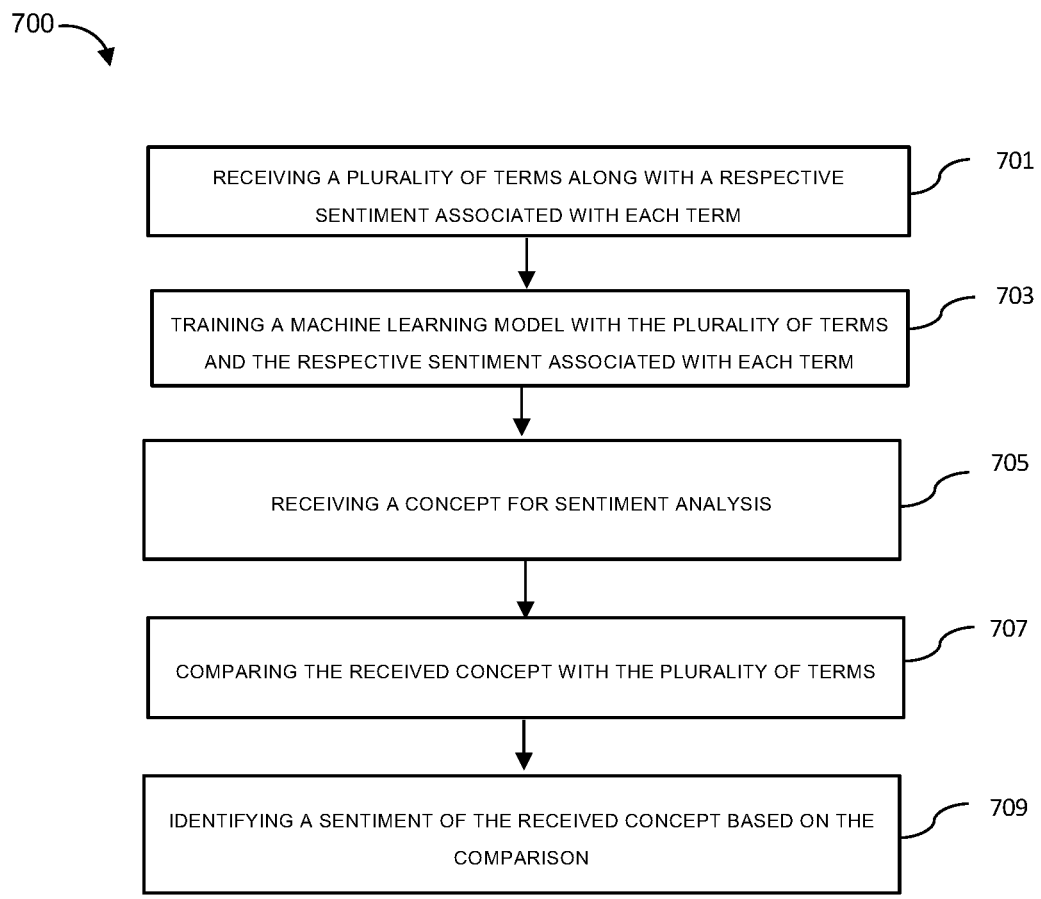
FIG. 7 depicts a flowchart illustrating an exemplary method of creating and training a machine learning model for sentiment analysis, in accordance with an aspect of the present disclosure.

FIG. 7 depicts a flowchart illustrating an exemplary method of creating and training a machine learning model for sentiment analysis, in accordance with an aspect of the present disclosure.

At step 701, a plurality of terms along with a respective sentiment associated with each term is received. The sentiment of the terms may have two categories such as positive sentiment and negative sentiment. Thus, each term of the plurality of terms may either fall in a category of positive sentiment or negative sentiment. However, the category of sentiment is not limited above examples and may comprise any other sentiment known to a person skilled in the art.

At step 703, a machine learning (ML) model may be trained with the plurality of terms along with the respective sentiment associated with each term. The ML model may learn and store the plurality of terms and respective sentiment in a database.

At step 705, the trained ML model may receive a concept for sentiment analysis. The concept may be a high prevalence concept of low prevalence concept. At step 707, the received concept may be compared with the plurality of terms that the ML model was trained with. The comparison may include creating a concept window and comparing the terms present in the concept window with the terms used for training the ML model, as discussed in above aspect of the present disclosure.

At step 709, a sentiment of the received concept identified based on the above comparison. The concept may either comprise a negative sentiment or a positive sentiment. However, the concept may comprise any other sentiment that the ML model may be trained with. Thus, the above-mentioned training of the ML model is not limited to only negative sentiment and positive sentiment and any other sentiment training is well within the scope f present disclosure.

The method 700 may be implemented in any suitable hardware, software, firmware, or combination thereof.

In another non-limiting aspect of the present disclosure, the steps of method 700 may be performed in an order different from the order described above.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of aspects. Those skilled in the art will appreciate that one or more of the described elements may well be combined into a single functional element. Alternatively, certain elements may be split into multiple functional elements. Elements from one aspect may be added to another aspect. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of aspects is by no means limited by these specific examples.

The aspects herein can comprise hardware and software elements. The aspects that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) interfaces or devices (including but not limited to keyboards, displays, pointing devices, external memory devices, internal memory devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the aspects may include a hardware configuration of an information handling/computer system in accordance with the aspects herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the aspects herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an aspect with several components in communication with each other does not imply that all such components are required. On the contrary, a variety of optional components are described to illustrate the wide variety of possible aspects of the invention. When a single device or article is described herein, it will be apparent that more than one device/article (whether or not they cooperate)

may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other aspects of the invention need not include the device itself.

The illustrated steps are set out to explain the exemplary aspects shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed aspects. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items.

What is claimed is:

1. A computer-implemented method of determining document bias in a document set, the method comprising:
   a) receiving, by a computing system comprising a processor and a memory, a document set comprising a plurality of documents;
   b) executing, by the processor, a Natural Language Processing (NLP) technique on the document set to identify one or more prevalent concepts in each document of the plurality of documents;
   c) storing, in the memory, a representation of the identified prevalent concepts;
   d) categorizing, by the processor, the one or more concepts as a high prevalence concept and a low prevalence concept based on one or more predefined statistical parameters, including a number of occurrences of a concept in a document, a number of occurrences of a concept in the document set, and a context of the document, and further based on a document-frequency determination over the document set that compares the number of occurrences of the concept in the document to the number of occurrences of the concept in the document set;
   e) identifying, by a sentiment analysis model executed on the processor and applied to a concept window of the document, the one or more low prevalence concepts with negative sentiment, wherein the sentiment analysis model is a pre-trained model trained to analyze contextual phrases;
   f) comparing, by the processor, the identified one or more low prevalence concepts with negative sentiment against a plurality of bias-related keywords stored in the memory to determine a bias document or concept, and flagging the bias document or concept;
   g) storing, in a non-transitory computer-readable medium, the at least one determined bias document or concept for future bias refinement and subsequent analysis and, responsive to review outcomes, automatically eliminating identified false positives through updating an unbiased list and a bias list, and training the model using the unbiased list;
   and
   h) displaying, on a graphical user interface, the determined bias document or concept via a bias visualization.

2. The method of claim 1, wherein the one or more parameters comprises the number of occurrences of a concept in the document, number of occurrences of a concept in the document set, and a context of the document.

3. The method of claim 1, wherein the one or more concepts comprises a term or a predetermined number of terms.

4. The method of claim 1, wherein identifying one or more low prevalence concepts with negative sentiment comprise:
   determining a concept window around the one or more low prevalence concepts, wherein the concept window indicates a number of terms on the left-hand side and the right-hand side of the concept;
   extracting a text for each of the one or more low prevalence concepts based on the concept window; and
   providing the extracted text of each low prevalence concept to a pre-trained model to determine the one or more low prevalence concepts with negative sentiment.

5. The method of claim 1, further comprising:
   storing the at least one determined bias document/concept in the memory.

6. The method of claim 1, wherein the document set comprise at least one of: email communications, word processor documents, portable document files, or a combination thereof.

7. The method of claim 1, further comprising:
   receiving a plurality of terms along with a respective sentiment associated with each term; and
   training a model with the plurality of terms and the respective sentiment associated with each term.

8. The method of claim 1, further comprising:
   reviewing the determined at least one bias document/concept present in the document set;
   determining whether the determined at least one bias document/concept is a false positive; and
   adding the at least one bias document/concept to an unbiased list if the false positive is determined.

9. A system for determining document bias in a document set, the system comprising:
   a) a computing system comprising a processor and a memory, the processor configured to execute computer-readable instructions stored in the memory;
   b) an input interface configured to receive a document set comprising a plurality of documents;
   c) a natural language processing (NLP) module executed by the processor, configured to identify one or more prevalent concepts in each document of the plurality of documents and store a representation of the identified prevalent concepts in the memory;
   d) a categorization module executed by the processor, configured to categorize the one or more concepts as a high prevalence concept and a low prevalence concept based on one or more predefined statistical parameters, including a number of occurrences of a concept in a document, a number of occurrences of a concept in the document set, and a context of the document, and further based on a document-frequency determination over the document set that compares the number of occurrences of the concept in the document to the number of occurrences of the concept in the document set;

e) a sentiment analysis module executed by the processor and applied to a concept window of the document, configured to identify the one or more low prevalence concepts with negative sentiment, wherein the sentiment analysis module is a pre-trained model trained to analyze contextual phrases;

f) a bias determination module executed by the processor, configured to compare the identified one or more low prevalence concepts with negative sentiment against a plurality of bias-related keywords stored in the memory to determine a bias document or concept and flagging the bias document or concept;

g) a storage module configured to store, in a non-transitory computer-readable medium, the at least one determined bias document or concept for future bias refinement and subsequent analysis and, responsive to review outcomes, automatically eliminating identified false positives through updating an unbiased list and a bias list, and training the model using the unbiased list;

and h) a visualization module configured to display, on a graphical user interface, the determined bias document or concept via a bias visualization.

10. The computing system of claim 9, wherein the processing unit is configured to categorize one or more concepts as a high prevalence concept and a low prevalence concept based on at least one of: the number of occurrences of a concept in the document, the number of occurrences of a concept in the document set, and a context of the document.

11. The computing system of claim 9, wherein the one or more concepts comprises a term or a predetermined number of terms.

12. The computing system of claim 9, wherein to identify one or more low prevalence concepts with negative sentiment, the processing unit is configured to:
  determine a concept window around the one or more low prevalence concepts, wherein the concept window indicates a number of terms on the left-hand side and the right-hand side of the concept,
  extract a text for each of the one or more low prevalence concepts based on the concept window, and
  provide the extracted text of each low prevalence concept to a pre-trained model to determine the one or more low prevalence concepts with negative sentiment.

13. The computing system of claim 9, wherein the processing unit is configured to:
  store the at least one determined bias document/concept in the memory.

14. The computing system of claim 9, wherein the document set comprise at least one of: email communications, word processor documents, portable document files, or a combination thereof.

15. The computing system of claim 9, wherein:
  the input interface is further configured to receive a plurality of terms along with a respective sentiment associated with each term, and
  the processing unit is configured to train a model with the plurality of terms and the respective sentiment associated with each term.

16. The computing system of claim 9, further comprise a monitoring unit configured to:
  review the determined at least one bias document/concept present in the document set,
determine whether the determined at least one bias document/concept is a false positive, and
add the at least one bias document/concept to an unbiased list if the false positive is determined.

17. A non-transitory computer-readable medium having computer-readable instructions that when executed by a processor causes the processor to perform operations comprising:
  a) receiving, by a computing system comprising a processor and a memory, a document set comprising a plurality of documents;
  b) executing, by the processor, a Natural Language Processing (NLP) technique on the document set to identify one or more prevalent concepts in each document of the plurality of documents;
  c) storing, in the memory, a representation of the identified prevalent concepts;
  d) categorizing, by the processor, the one or more concepts as a high prevalence concept and a low prevalence concept based on one or more predefined statistical parameters, including a number of occurrences of a concept in a document, a number of occurrences of a concept in the document set, and a context of the document,
  and further based on a document-frequency determination over the document set that compares the number of occurrences of the concept in the document to the number of occurrences of the concept in the document set;
  e) identifying, by a sentiment analysis model executed on the processor and applied to a concept window of the document, the one or more low prevalence concepts with negative sentiment, wherein the sentiment analysis model is a pre-trained model trained to analyze contextual phrases;
  f) comparing, by the processor, the identified one or more low prevalence concepts with negative sentiment against a plurality of bias-related keywords stored in the memory to determine a bias document or concept and flagging the bias document or concept;
  g) storing, in a non-transitory computer-readable medium, the at least one determined bias document or concept for future bias refinement and subsequent analysis
  and, responsive to review outcomes, automatically eliminating identified false positives through updating an unbiased list and a bias list, and training the model using the unbiased list;
  and
  h) displaying, on a graphical user interface, the determined bias document or concept via a bias visualization.

* * * * *